(No Model.) 2 Sheets—Sheet 1.
A. MAN.
Joining Pieces of Glass, Porcelain, &c.

No. 227,370. Patented May 11, 1880.

WITNESSES. INVENTOR.

(No Model.) 2 Sheets—Sheet 2.

A. MAN.
Joining Pieces of Glass, Porcelain, &c.

No. 227,370. Patented May 11, 1880.

WITNESSES.

INVENTOR.
Albon Man, By
Amos Broadnax
Atty

UNITED STATES PATENT OFFICE.

ALBON MAN, OF BROOKLYN, NEW YORK.

JOINING PIECES OF GLASS, PORCELAIN, &c.

SPECIFICATION forming part of Letters Patent No. 227,370, dated May 11, 1880.

Application filed March 22, 1880. (No model.)

*To all whom it may concern:*

Be it known that I, ALBON MAN, of Brooklyn, county of Kings, and State of New York, have invented a new and useful method of joining or uniting together two or more pieces or articles of glass, china, porcelain, crockery, stoneware, or other similar material, or framing or protecting them with metal; and I do hereby declare the following to be a description of my said invention in such full, clear, exact, and concise terms as to enable any one skilled in the arts or sciences to which it appertains or with which it is most nearly connected to use and practice the same, reference being had to the accompanying drawing, making part of this specification, and to the letters and figures of reference marked thereon.

My invention consists of a novel method of uniting together with a tight joint two or more pieces or articles of the material aforesaid, or of joining with a tight joint one or more pieces or articles of the material aforesaid to an article or piece of metal, and in framing or protecting articles of the material aforesaid and articles composed in part of the material aforesaid and in part of metal.

The joint and other application of my invention is made substantially as follows: I first avail myself of the well-known arts and process of fire-gilding, silvering, or platinizing, or metallizing, by which I cover or fill any of the articles or parts of the material aforesaid with a coating of any of the metals used in those arts, taking the one best adapted to the fabrication and use of the article or combination of articles to be united or fabricated, first roughing the surface of the glass or other material, in case of need, either by sand-blast or grinding, the better to make the metal adhere, and when the metal coating has been applied I call the article "metallized."

Instead of fire-gilding, silvering, or platinizing the parts or surfaces to which the metal coating is to be applied, it may be metallized— that is, prepared for the coating by filling it— that is, incorporating in its substance, or in that part of it to be coated, while hot, enough lead, zinc, or other metals, or their oxides or salts, to make it a conductor of electricity; or the surface can be prepared for electroplating by the application of an amalgam of quicksilver and tin, or other suitable metal similar to the backing of looking-glasses, and the quicksilver, if necessary, can be driven off by heat; or it can be so prepared by silvering by direct reduction of silver from its salts upon the glass.

Having metallized the parts to be united as aforesaid, by any suitable process known to the art, I place them in an electroplating solution and electroplate by the ordinary process of electroplating over the metallized surface of the parts or articles to be united or joined together. The metallized parts or pieces, being thus electroplated, are now brought together and united with solder, thus making a tight metal joint upon the articles or pieces of glass or other material aforesaid and between the pieces or articles of glass or other material aforesaid. By these means a vessel made of glass or any of the material aforesaid can be hermetically sealed with a metal sealing, or two or more vessels of any of the material aforesaid can be hermetically joined and fabricated with the utmost firmness. Before the joining of the articles or parts, the electroplating can be turned, polished, silvered, or otherwise plated or finished to suit the taste or exigency of the fabricator.

Instead of electroplating the respective parts or pieces to be united, and then joining or sealing them with solder, as above described, the metallized parts or pieces of any of the material aforesaid may be brought together and placed in the electroplating solution and electroplated together over the joint, by which the parts or pieces of the article to be fabricated, joined, or sealed, of any of the material or substances aforesaid, are united with a firm metallic air-tight joint without the intervention of solder.

In many cases it is necessary to metallize both sides of the edges of the parts to be joined, so that the electroplating will adhere to both sides of the joined edges, by which greater firmness, strength, and tightness are obtained in the joint.

Any of the metals adapted for fire-gilding, silvering, or platinizing may be used to metallize the surfaces or parts to be joined, and any of the metals adapted for filling may be used to metallize the parts in that way, and any of the metals adapted to electroplating may be used to electroplate the metallized parts, and any of the solders may be used to unite or join the electroplated parts; but the temperature of the article to be metallized must, of course, be prepared with reference to the metal to be used, either in metallizing the parts or in soldering them to make the joint or sealing.

In selecting a metal to be used in electroplating or metallizing the parts to be united, or a solder to be used in joining them, reference should be had to its capacity to expand, and the metal or solder selected should approximate as nearly as possible in its capacity to expand to that of the article or material to which it is to be applied.

The invention is especially applicable to the sealing of electric lamps, or air-pumps and other philosophical apparatus made of glass, as it is, also, in joining, fabricating, and sealing any article or vessel made of glass, porcelain, crockery, or any similar material.

In the drawings, Figure 1 shows the invention applied to the sealing of an electric lamp. The metallized and joined surfaces or parts are shown by the heavy lines $a$, $b$, $c$, $d$, and $f$. The glass globe of the lamp is shown by A, the glass base by B. The electric-circuit wire is represented by E F, the burner by O, and a metallic ring upon which the globe stands in the base by C, and a metallic tube through which the current is carried into the lamp by D, the continuity of the electric circuit being maintained through the metal joints by which the several parts of the lamp are united and sealed.

By Fig. 2 is shown a transverse section through the lamp, and illustrates another view of the same parts.

Figures 1, 2:
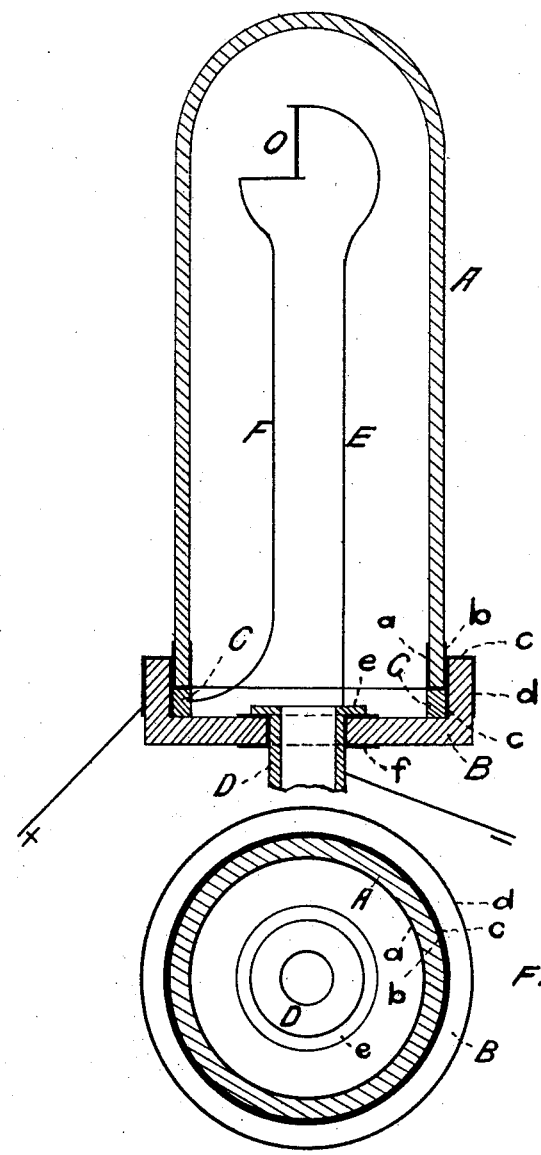
Figure 4:
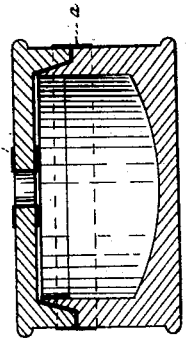
Fig. 4 shows the invention applied to a small china jar, the metallized and electroplated and joined parts or surfaces being shown by $a\ a$.
Figure 5:
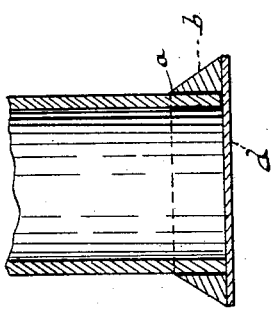
Fig. 5 shows a glass lid of the box, Fig. 3, with the part $a$ electroplated.
Figure 8:
Figure 3:
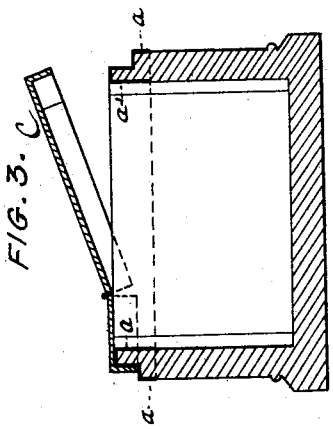
Fig. 3 is a glass box, to which a metallic lid, $c$, is applied. The metallized and electroplated parts by which the joint is made are shown by $a\ a\ a\ a$.
Figure 6:
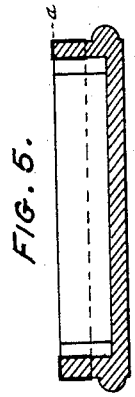
Fig. 6 is a glass tube with a metal plate, $d$, joined to it by solder $b$. $a$ in this case also represents the metallized and electroplated part.
Figure 7:
Fig. 7 shows two ends of a glass tube joined together by electroplating $a$ and soldering $b$. So, also, does Fig. 8, and the latter figure also shows a metal tube, C, joined to the glass tube by soldering and electroplating $a$ and $b$.

The principle is, of course, the same in all cases, these articles being united merely to show the practical application of the invention, which includes and embraces the sealing and joining of articles or pieces made of any of the materials aforesaid together, or to pieces of metal with a tight metal joint applied directly to the surface of the parts, pieces, or articles to be joined, protected, strengthened, or sealed, as in the application of ribs, bands, or parts of metals to any article, part, or piece made of any of the material or substance aforesaid, for the purpose aforesaid.

In concluding this description of my invention, I repeat that it consists of the joining, sealing, protecting, framing, or fabricating any article or articles, piece or pieces made wholly of any of the materials aforesaid, or made partly of the materials aforesaid and partly of metal, without reference to the manner of metallizing the surface; and that I use the word "metallize" to describe the surface of any of the materials aforesaid prepared to receive the electroplating by any process known to the arts.

I claim as my invention—

1. The method herein described of joining, sealing, framing, fabricating, strengthening, or protecting articles or parts or pieces of articles made of glass, porcelain, crockery, or other similar material or substance, consisting of the following steps in combination, viz: first, metallizing the surface; second, electroplating on the metallized surface; third, soldering the electroplated parts together.

2. Electroplating a coating, band, or rib of metal upon a metallized surface of any article or part of any article made of any of the materials aforesaid, for the purpose of joining, strengthening, sealing, protecting, or fabricating the same.

3. Joining, framing, sealing, or fabricating two or more articles or parts of articles made of any of the materials aforesaid by first metallizing the parts to be joined, sealed, framed, strengthened, protected, or fabricated, and by then electroplating upon the contiguous metallized surfaces and over the joint, by which a tight solid metal union, joint, or connection is made between the articles or parts joined or united.

ALBON MAN.

Witnesses:
AMOS BROADNAX,
WM. H. BROADNAX.